(12) United States Patent
Chiu et al.

(10) Patent No.: US 11,697,256 B2
(45) Date of Patent: Jul. 11, 2023

(54) METHOD FOR INJECTION MOLDING WELD LINE FREE MINUS POWER LENS ELEMENTS

(71) Applicant: Essilor International, Charenton-le-Pont (FR)

(72) Inventors: Hao-Wen Chiu, Dallas, TX (US); Shannon Loiselle, Dallas, TX (US); Shawn Mcdermott, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 951 days.

(21) Appl. No.: 16/480,511

(22) PCT Filed: Jan. 26, 2018

(86) PCT No.: PCT/EP2018/051999
§ 371 (c)(1),
(2) Date: Jul. 24, 2019

(87) PCT Pub. No.: WO2018/138285
PCT Pub. Date: Aug. 2, 2018

(65) Prior Publication Data
US 2019/0389159 A1    Dec. 26, 2019

(30) Foreign Application Priority Data

Jan. 27, 2017   (EP) .................................... 17153630

(51) Int. Cl.
*B29D 11/00* (2006.01)
*G02B 5/00* (2006.01)
(Continued)

(52) U.S. Cl.
CPC .... *B29D 11/0048* (2013.01); *B29D 11/00692* (2013.01); *G02B 5/003* (2013.01);
(Continued)

(58) Field of Classification Search
CPC .......... B29D 11/0048; B29D 11/00692; G02B 5/003; B29K 2069/00; B29K 2105/0005; B29K 2909/08
See application file for complete search history.

(56) References Cited

U.S. PATENT DOCUMENTS 6,616,868 B1 * 9/2003 Gotoh .................... B29C 45/561
 264/2.2
6,767,482 B2 * 7/2004 Nishimoto ............ B29C 45/561
 425/808

(Continued)

FOREIGN PATENT DOCUMENTS

AU    2002240709 B2    2/2008
EP    1 106 326 A1    6/2001
(Continued)

OTHER PUBLICATIONS

European Office Action dated May 18, 2020 in European Patent Application No. 17153630.3, 7 pages.
(Continued)

*Primary Examiner* — Mathieu D Vargot
(74) *Attorney, Agent, or Firm* — Oblon, McClelland, Maier & Neustadt, L.L.P.

(57) ABSTRACT

A method for injection molding of a weld line free minus power lens element comprises injecting a melt of thermoplastic material at a temperature higher than a glass transition temperature (Tg) of the thermoplastic material in an initial molding cavity delimited by two facing mold inserts, wherein the melt of thermoplastic material comprises at least one UV absorber. During the injecting, the two facing mold inserts are moved toward one another to define a final molding cavity whose volume is less than that of the initial molding cavity. After cooling and disassembling of the two facing mold inserts, the weld line free minus power lens element is recovered. One of the two facing mold inserts (Continued)

comprises a flat surface facing the initial molding cavity, thereby to form a flat surface on one side of the weld line free minus power lens element. The other of the two facing mold inserts comprises a convex surface facing the initial molding cavity, thereby to form a concave surface on an opposite side of the weld line free minus power lens element.

7 Claims, 1 Drawing Sheet

(51) Int. Cl.
    *B29K 69/00*     (2006.01)
    *B29K 105/00*     (2006.01)

(52) U.S. Cl.
    CPC .. *B29K 2069/00* (2013.01); *B29K 2105/0005* (2013.01); *B29K 2909/08* (2013.01)

(56) References Cited

U.S. PATENT DOCUMENTS

| | | |
|---|---|---|
| 7,457,040 B2 | 11/2008 | Amitai |
| 7,854,865 B2 | 12/2010 | Chiu et al. |
| 2003/0201555 A1 | 10/2003 | Gotoh et al. |
| 2004/0178525 A1 | 9/2004 | Kagei et al. |
| 2004/0188873 A1* | 9/2004 | Ono ................. B29D 11/00528 264/1.32 |
| 2006/0170125 A1 | 8/2006 | Baresich et al. |
| 2013/0161844 A1 | 6/2013 | Takatori et al. |
| 2016/0237275 A1* | 8/2016 | Mäder ................... C08K 5/005 |

FOREIGN PATENT DOCUMENTS

| | | |
|---|---|---|
| EP | 1 410 889 A1 | 4/2004 |
| EP | 1 426 158 A1 | 6/2004 |
| JP | 59-143617 A | 8/1984 |
| JP | 2000-6215 A | 1/2000 |

OTHER PUBLICATIONS

International Search Report and Written Opinion dated Mar. 13, 2018 in PCT/EP2018/051999 filed on Jan. 26, 2018.

\* cited by examiner

METHOD FOR INJECTION MOLDING WELD LINE FREE MINUS POWER LENS ELEMENTS

BACKGROUND OF THE INVENTION

1. Field of the Invention

The invention relates generally to a method for injection molding weld line free minus power lens elements.

2. Description of Related Art

Prescription augmented reality eyewear may comprise lens assemblies in which a light-guide optical element (LOE) as described for example in U.S. Pat. No. 7,457,040 is sandwiched between a front plano-concave (plus) lens, and a rear plano-convex (minus) lens, wherein the front and rear lenses correct the vision of the wearer.

The front and rear lenses of such an assembly, however, are much thinner than conventional one-piece lens wafers, which poses significant challenges as regards their manufacture. It would be highly desirable to produce the wafers from which such plus and minus lenses are cut by an injection molding process, as is done for lens wafers for conventional eyeglass lenses; however, the plus and minus lenses used in the three-part lens assembly for augmented reality eyewear, have dimensions such that they are not well suited to being made using conventional injection molding techniques, such as those described in commonly-owned U.S. Pat. No. 7,854,865.

SUMMARY OF THE INVENTION

Thus, in one aspect, the present invention relates to a method for injection molding of a weld line free minus power lens element, comprising injecting a melt of thermoplastic material at a temperature higher than a glass transition temperature (Tg) of the thermoplastic material in an initial molding cavity delimited by two facing mold inserts, wherein the melt of thermoplastic material comprises at least one UV absorber. During the injecting, the two facing mold inserts are moved toward one another to define a final molding cavity whose volume is less than that of the initial molding cavity. After cooling and opening of the molding cavity, the weld line free minus power lens element is recovered. One of the two facing mold inserts comprises a flat surface facing the initial molding cavity, thereby to form a flat surface on one side of the weld line free minus power lens element. The other of the two facing mold inserts comprises a convex surface facing the initial molding cavity, thereby to form a concave surface on an opposite side of the weld line free minus power lens element.

In exemplary embodiments of the method according to the present invention, each of the two facing mold inserts comprises a material having a thermal diffusivity $\alpha$ that satisfies $1 \leq \alpha/\alpha_g < 11$, where $\alpha_g$ is $6.20 \times 10^{-7}$ m$^2$/s.

In exemplary embodiments of the method according to the present invention, each of the two facing mold inserts is formed at least in part of borosilicate crown glass.

In exemplary embodiments of the method according to the present invention, the injecting is performed at a speed of not more than 25 mm/s.

In exemplary embodiments of the method according to the present invention, the injecting is performed at a speed of not more than 15 mm/s.

In exemplary embodiments of the method according to the present invention, a center distance between the two facing mold inserts when delimiting the initial molding cavity is not more than five times a center thickness of the weld line free minus power lens element.

In exemplary embodiments of the method according to the present invention, a center distance between the two facing mold inserts when delimiting the initial molding cavity is 1.5 to 4 times a center thickness of the weld line free minus power lens element.

In exemplary embodiments of the method according to the present invention, the moving of the two facing mold inserts toward one another is effected at a speed of less than 150 mm/s.

In exemplary embodiments of the method according to the present invention, the moving of the two facing mold inserts toward one another is effected at a speed of 25-100 mm/s.

In exemplary embodiments of the method according to the present invention, the moving of the two facing mold inserts toward one another is effected at a pressure of not more than 50 US tons.

In exemplary embodiments of the method according to the present invention, the moving of the two facing mold inserts toward one another is effected at a pressure of less than 25 US tons.

In exemplary embodiments of the method according to the present invention, the thermoplastic material includes one or more of polycarbonates, polyacrylics, polyols, polyamines, polyamides, polyanhydrides, polycarboxilic acids, polyepoxides, polyisocyanates, polynorbornenes, polysiloxanes, polysilazanes, polystyrenes, polyolefinics, polyesters, polyimides, polyurethanes, polythiourethanes, polyallylics, polysulfides, polyvinylesters, polyvinylethers, polyarylenes, polyoxides, polysulfones, poly cyclo olefins, polyacrylonitriles, polyethylene terephtalates, polyetherimides, polypentenes, and cellulose triacetate.

In exemplary embodiments of the method according to the present invention, the thermoplastic material is a polycarbonate resin.

In exemplary embodiments of the method according to the present invention, the polycarbonate resin has a melt flow rate at 300° C./1.2 kg that is at least 15 cm$^3$/10 min.

In exemplary embodiments of the method according to the present invention, the polycarbonate resin has a melt flow rate at 300° C./1.2 kg that is at least 20 cm$^3$/10 min.

In exemplary embodiments of the method according to the present invention, the polycarbonate resin has a weight average molecular weight of less than 26,000 g/mol.

In exemplary embodiments of the method according to the present invention, the at least one UV absorber is a benzotriazole absorber.

In exemplary embodiments of the method according to the present invention, the at least one UV absorber is 2,2'-methylenebis(6-(2H-benzotriazol-2-yl)-4-1,1,3,3-tetramethylbutyl)phenol).

In exemplary embodiments of the method according to the present invention, the at least one UV absorber is 2-(5-chloro-2H-benzotriazol-2-yl)-6-(1,1-dimethylethyl)-4-methyl phenol.

In exemplary embodiments of the method according to the present invention, the flat surface of the one of the two facing mold inserts has less than 20 fringes as indicated by flatness measurements using interference fringes of monochromatic light.

In exemplary embodiments of the method according to the present invention, the flat surface of the one of the two facing mold inserts has less than 10 fringes as indicated by flatness measurements using interference fringes of monochromatic light.

In exemplary embodiments of the method according to the present invention, the weld line free minus power lens element has a center thickness of at most 1.5 mm.

In exemplary embodiments of the method according to the present invention, the weld line free minus power lens element has an edge thickness in a range of 1.0 to 11.5 mm.

In exemplary embodiments of the method according to the present invention, the flat side of the weld line free minus power lens element is bonded to one side of a light-guide optical element.

In exemplary embodiments of the method according to the present invention, a positive power lens element is bonded to an opposite side of the light-guide optical element.

In another aspect, the present invention relates to a weld line free minus power lens element, comprising a wafer of thermoplastic material comprising at least one UV absorber. The wafer has a first major surface that is flat and a second major surface that is concave. The wafer has a diameter in a range from 55-85 mm and a center thickness of at most 1.5 mm.

BRIEF DESCRIPTION OF THE DRAWINGS

Other objects, features and advantages of the invention will become more apparent after reading the following detailed description of exemplary embodiments of the invention, given with reference to the accompanying drawings, in which.

DETAILED DESCRIPTION OF EXEMPLARY EMBODIMENTS

Figure 1A:
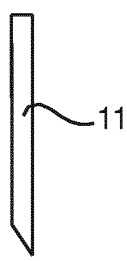
FIG. 1a is a schematic side view of a light-guide optical element suitable for use in a prescription augmented reality eyewear lens assembly.
Figure 1B:
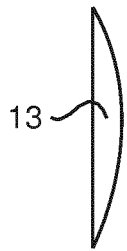
FIG. 1b is a schematic side view of a plano-concave lens suitable for use in a prescription augmented reality eyewear lens assembly.
Figure 1C:
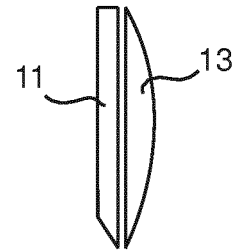
FIG. 1c is a schematic side view of a light-guide optical element to which a plano-concave lens has been bonded.
Figure 1D:
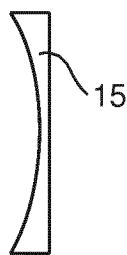
FIG. 1d is a schematic side view of a plano-convex lens suitable for use in a prescription augmented reality eyewear lens assembly, and produced according to the method of the present invention.
Figure 1E:
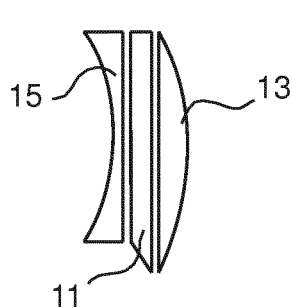
FIG. 1e is a schematic side view of the subassembly of FIG. 1c, to which a plano-convex lens produced according to the method of the present invention has been bonded.
Figure 1F:
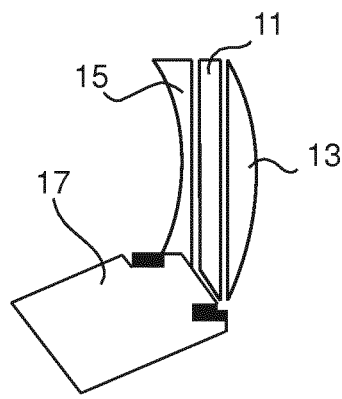
FIG. 1f is a schematic side view of the subassembly of FIG. 1e, to which a micro-display projector has been bonded.
Figure 2:
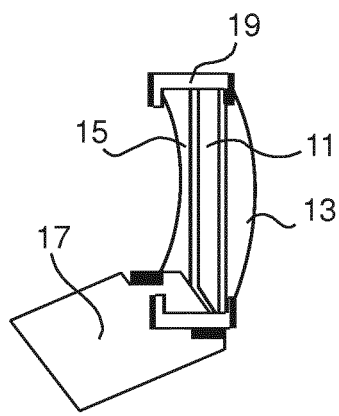
FIG. 2 is a schematic side view in which the assembly of FIG. 1f has been mounted into eyeglass frames.

Referring now to FIG. 1a, a light-guide optical element (LOE) 11 may be produced as described for example in U.S. Pat. No. 7,457,040. In order to provide prescription augmented reality eyewear, a front plano-concave (plus) lens 13 as shown in FIG. 1b is bonded to the LOE 11, as shown in FIG. 1c. A rear plano-convex (minus) lens 15 as shown in FIG. 1d is then bonded to the rear side of LOE 11, as shown in FIG. 1e. Next, a micro-display projector 17 is bonded to the edge of LOE 11, as shown in FIG. 1f, and that lens assembly is then mounted into a pair of eyeglass frames 19, as shown in FIG. 2.

The wafers from which the minus lenses 15 are made include a flat side and a curved side, and preferably meet very stringent geometrical, optical, and performance requirements as shown below. In particular, such lenses should have a center thickness (CT) that is at most 1.5 mm. They should also permit obtaining a lens assembly having a power profile (sphere, cylinder, prism) in which sphere and cylinder are within the range of ±0.06 diopter (D), and prism is within ±(0.25+0.1*power)/2. Power homogeneity as determined by Dual LensMapper (DLM, manufactured by Automation & Robotics SA) measurement of a 16×16 mm² square area at lens center is preferably to have both sphere and cylinder peak-to-valley (PtV) values of less than 0.15D. Warpage of the flat surface of the minus lens 15 as determined by an Automation & Robotics SA Focovision SR-2 is preferably such that sphere and cylinder are within ±0.06D (whereas in a typical lens product a warpage up to 0.50D is allowed). Furthermore, warpage evolution of the flat surface after coating, as measured by SR-2 is preferably such that changes of sphere and cylinder are within ±0.03D. The assembly should furthermore pass FDA/CEN, thermal shock, compression test, and UV aging tests.

Such requirements present great challenges for injection molding. Injection molding of a minus wafer (or lens) is done by filling the molding cavity from one side to the other. However, for a minus wafer, the center thickness is thin while the edge thickness is much thicker. Filling of such wafers of high aspect ratio poses difficulties in that the flow resistance around the thin center is much higher than that around the thick edge. As a result, the melt front tends to wrap around the center so that the leading edge is folded back upon itself to produce a weld line that is considered a cosmetic defect.

A further difficulty arises in that the thinner center cools down and solidifies much earlier than the rest of the wafer, which can lead to uneven shrinkage. Typically, for injection molding, part shrinkage is compensated through packing in more material. However, the high flow resistance around the thin center of a minus wafer prevents such packing from being effective. As a result, the uneven shrinkage remains and a small bulge forms, which leads to high distortion at the center of the wafer as measured by SR2 from the flat side.

Still further, the high flow resistance at the center of a minus wafer requires very high injection pressure to fill the cavity, which can result in high residual stresses in molded parts that would eventually lead to high warpage before and after coating.

All of the foregoing difficulties have been impediments to the use of existing polycarbonate lens injection process configurations, including machines and high viscosity ophthalmic grade PC resins, in producing wafers that meet LOE assembling requirements.

The method according to the present invention provides an injection-molding technique for making minus power wafers, preferably from polycarbonate, that meet the above mentioned performance criteria, especially as regards thickness and warpage.

In particular, it has been found that combining an injection-compression process with glass inserts is effective to prevent the formation of a weld-line. Furthermore, it has been found that the use of a high flow resin instead of regular ophthalmic grades would reduce the flow resistance and thus the residual stresses. A process for injection molding minus wafers, preferably from polycarbonate, using an injection-compression process with specific process parameters, flat glass inserts having specific flatness, and a high flow preferably polycarbonate resin of a specific viscosity range, is described herein.

EXAMPLES

In general, a mold cavity for injection molding of minus wafers is formed by two opposite faced inserts, one flat and the other convex (CX). To address the weld-line issue, inserts made of crown glass or other materials having a thermal diffusivity $\alpha$ that satisfies $1 \leq \alpha/\alpha_g < 11$, where $\alpha_g$ is the thermal diffusivity of a boronsilicate crown glass being equal to $6.20 \times 10^{-7}$ m$^2$/s need to be used together with an injection-compression process.

An injection-compression process is typically characterized by forming a cavity having an opening that is larger than target part thickness at the beginning of an injection cycle. This enlarged cavity thickness would significantly reduce the flow resistance and thus the pressure requirement of filling the cavity. Subsequently, the cavity opening would close down through movement of inserts and/or mold plates to the final part thickness before the end of injection. The injection speed, initial opening of the cavity, closing speed, and closing pressure, however, need to be carefully determined not only to control the movement of the flow front to avoid creation of a weld-line but also to prevent breakage of inserts made of brittle materials such as crown glass. It was found that the injection speed should be 25 mm/s, and preferably 15 mm/s. The center distance of the initial cavity opening should be no more than 5 times the target center thickness of the minus wafers, and preferably between 1.5 to 4 times. Closing of the mold cavity should be slow with a speed 150 mm/s and preferably between 25 and 100 mm/s. The closing pressure is preferably not more than 50 US tons per cavity and preferably less than 25 US tons.

It was also found, however, that the combination of an injection-compression process and glass inserts alone is generally not sufficient to produce minus wafers meeting the optical requirements when using high viscosity ophthalmic grade polycarbonate (PC) resins such as Sabic Lexan RL7220. A high flow PC resin having a weight average molecular weight of less than 26,000 and a melt flow rate at 300° C./1.2 kg of at least 15 cm$^3$/10 min and preferably at least 20 cm$^3$/10 min per IS01133 or a viscosity of less than 400 Pa for shear rates below 1000 s$^{-1}$ at 300° C. facilitates efficient packing of the thin center, reduces residual stresses, and minimizes warpage.

Furthermore, very flat inserts having less than 20 fringes, and preferably less than 10 fringes, as indicated by flatness measurements using interference fringe of monochromatic should be used in order to guarantee the flat side of a wafer meets flatness requirements for LOE assembling process.

Lastly, as most commercial high flow optical grade PC resins are for indoor applications such as producing CD/DVD or Blue-ray discs, they typically do not contain UV absorbers (UVA) that are needed for preventing UV aging of the LOE assembly and providing UV protection to wearers' eyes. An in-house formulation consisting of 0.1 wt % of BASF Tinuvin 360 benzotriazole UV absorber blended with high flow PC resin was developed. The formulation was shown to achieve 380 nm UV cut-off that effectively prevented the resulting wafers from undergoing UV aging as indicated by a zero increase in yellowness index after 80 hours of QSun test.

The wafer thus produced will include a gate mark as an artifact of the injection molding process.

Utilizing the foregoing criteria a combination of an injection-compression process with carefully selected process parameters, flat glass inserts having specific flatness, and a high flow PC resin containing UVA and within a specific viscosity range has been utilized to injection mold minus LOE PC wafers that meet very strict geometrical, optical, and performance requirements.

In the table below, injection molding results of minus LOE PC wafers produced according to the present invention, shown in the right-hand column, are compared to wafers produced conventionally, shown in the left-hand column:

| Example - Injection molding of −1.00/0.00 LOE PC wafers | | |
|---|---|---|
| PC resin | Sabic Lexan RL7220 ophthalmic | Sabic Lexan OQ1028 high flow |
| MFR (300° C./1.2 kg) | MFR ~7 (cm$^3$/10 min) | MFR > 50 (cm$^3$/10 min) |
| Experimental setup | | |
| Injection molding machine | Nissei ES4000 | Nissei FN4000 |
| Mold | 2-cavity | 2-cavity |
| Diameter (mm) | 70 | 70 |
| Flat insert type and flatness | SS with TiN coating - 4-fringe flatness | Glass - 5-fringe flatness |
| CX insert type and radius | SS/TiN - R$_{CX}$ 586.9 mm | Glass - R$_{CX}$ 586.9 mm |
| Injection molding process parameters | | |
| PC resin drying | 250° F. for 4 hours in a desiccant dryer | 250° F. for 4 hours in a desiccant dryer |
| Mold temperature (° F.) | 265 | 265 |
| Melt temperature (° F.) | 580 | 580 |
| Shot size (cm$^3$) | 43 | 43 |
| Injection speed (mm/s) | 66 | 5.3 |
| Injection-compression | No | Yes |
| Initial gap (mm) | N/A | 2.5 |
| Closing speed (mm/s) | N/A | 50 |
| Resulting minus wafers | | |
| Center thickness (mm) | 1.4 | 1.4 |
| Weld-line | Yes | No |

| Example - Injection molding of −1.00/0.00 LOE PC wafers | | |
|---|---|---|
| PC resin<br>MFR (300° C./1.2 kg) | Sabic Lexan RL7220 ophthalmic<br>MFR ~7 (cm$^3$/10 min) | Sabic Lexan OQ1028 high flow<br>MFR > 50 (cm$^3$/10 min) |
| SR2 @ wafer flat side center | | |
| Sphere (mean) | 0.19 | −0.03 |
| Sphere (stdev) | 0.03 | 0.03 |
| Cylinder (mean) | 0.14 | 0.03 |
| Cylinder (stdev) | 0.04 | 0.02 |
| SPV1 through power | | |
| Sphere (mean) | −0.95 | −1.01 |
| Sphere (stdev) | 0.01 | 0.01 |
| Cylinder (mean) | 0.01 | 0.02 |
| Cylinder (stdev) | 0.01 | 0.01 |

As the above data shows, −1.00 wafers meeting optical and geometrical requirements were successfully molded using the present method. On the other hand, using regular ophthalmic grade PC with a straight injection process resulted in wafers of poor optics. The high positive SR-2 sphere value at the center of the wafer flat side indicated the existence of a bulge.

It will be appreciated that the present method permits using existing injection molding machines and convex glass inserts, so that there is no need to acquire new machines, while minus wafers meeting all performance requirements can be produced.

While the present invention has been described in connection with various exemplary embodiments thereof, it is to be understood that those embodiments are provided merely to illustrate the invention, and should not be used as a pretext to limit the scope of protection conferred by the true scope and spirit of the appended claims.

The invention claimed is:

1. A method for injection molding of a weld line free minus power lens element made from polycarbonate with a weight average molecular weight of less than 26,000 g/mol, comprising:
   injecting a melt of thermoplastic material comprising at least one UV absorber that is a benzotriazole absorber at a temperature higher than a glass transition temperature (Tg) of the thermoplastic material and at a speed of not more than 25 mm/s in an initial molding cavity delimited by two facing mold inserts;
   during said injecting, moving said two facing mold inserts toward one another at a speed of less than 150 mm/s and at a pressure of not more than 50 US tons to define a final molding cavity whose volume is less than that of said initial molding cavity, and
   after cooling and opening of the molding cavity, recovering the weld line free minus power lens element,
   wherein one of said two facing mold inserts comprises a flat surface facing the initial molding cavity, thereby to form a flat surface on one side of the weld line free minus power lens element,
   wherein the other of said two facing mold inserts comprises a convex surface facing the initial molding cavity, thereby to form a concave surface on an opposite side of the weld line free minus power lens element, and
   wherein the center distance between said two facing mold inserts when delimiting said initial molding cavity is not more than five times a center thickness of the weld line free minus power lens element.

2. The method according to claim 1, wherein the weld line free minus power lens element has a center thickness of at most 1.5 mm.

3. The method according to claim 1, wherein each of said two facing mold inserts is formed at least in part of borosilicate crown glass.

4. The method according to claim 1, wherein the at least one UV absorber is 2,2'-methylenebis(6-(2H-benzotriazol-2-yl)-4-1,1,3,3-tetramethylbutyl)-phenol).

5. The method according to claim 1, wherein the at least one UV absorber is 2-(5-chloro-2H-benzotriazol-2-yl)-6-(1,1-dimethylethyl)-4-methyl phenol.

6. The method according to claim 1, wherein the flat surface of said one of the two facing mold inserts has less than 20 fringes as indicated by flatness measurements using interference fringes of monochromatic light.

7. The method according to claim 1, further comprising bonding the flat surface of the weld line free minus power lens element to one side of a light-guide optical element.

* * * * *